United States Patent
Choi et al.

(10) Patent No.: US 9,914,885 B2
(45) Date of Patent: Mar. 13, 2018

(54) PROCESS TO UPGRADE AND DESULFURIZE CRUDE OIL BY SUPERCRITICAL WATER

(71) Applicant: Saudi Arabian Oil Company, Dhahran (SA)

(72) Inventors: Ki-Hyouk Choi, Dhahran (SA); Joo-Hyeong Lee, Dhahran (SA); Mohammad S. Garhoush, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 100 days.

(21) Appl. No.: 13/785,437

(22) Filed: Mar. 5, 2013

(65) Prior Publication Data
US 2014/0251871 A1    Sep. 11, 2014

(51) Int. Cl.
| | |
|---|---|
| *C10G 53/02* | (2006.01) |
| *C10G 31/08* | (2006.01) |
| *C10G 31/09* | (2006.01) |
| *B01D 11/04* | (2006.01) |
| *C10G 45/26* | (2006.01) |

(52) U.S. Cl.
CPC .......... *C10G 53/02* (2013.01); *B01D 11/0403* (2013.01); *C10G 31/08* (2013.01); *C10G 31/09* (2013.01); *C10G 45/26* (2013.01); *B01D 11/0423* (2013.01); *C10G 2300/1033* (2013.01); *C10G 2300/202* (2013.01); *C10G 2300/208* (2013.01); *C10G 2300/4006* (2013.01); *C10G 2300/4012* (2013.01); *C10G 2300/42* (2013.01)

(58) Field of Classification Search
CPC .......... C10G 31/08; C10G 31/09; C10G 53/02
See application file for complete search history.

(56) References Cited

U.S. PATENT DOCUMENTS

| | | |
|---|---|---|
| 2,591,525 A | 4/1952 | Engel et al. |
| 4,005,005 A | 1/1977 | McCollum et al. |
| 4,543,190 A | 9/1985 | Modell |
| 4,818,370 A | 4/1989 | Gregoli et al. |
| 5,252,224 A | 10/1993 | Modell et al. |
| 5,527,466 A | 6/1996 | Li et al. |
| 6,887,369 B2 | 5/2005 | Moulton et al. |

(Continued)

FOREIGN PATENT DOCUMENTS

| | | |
|---|---|---|
| JP | 2011219538 A | 11/2011 |
| WO | 2002/0074881 A1 | 9/2002 |

OTHER PUBLICATIONS

PCT International Search Report and the Written Opinion of the International Searching Authority dated Jun. 3, 2014; International Application No. PCT/US2013/020689; International File Date: Mar. 5, 2013.

(Continued)

*Primary Examiner* — Renee Robinson
(74) *Attorney, Agent, or Firm* — Bracewell LLP; Constance Gall Rhebergen (57) ABSTRACT

This present invention generally relates to a process for upgrading and desulfurizing crude oil using supercritical water. In general, the invention provides a process for removal of contaminants from a crude oil stream by mixing the crude oil stream with supercritical water and then filtering out the precipitated solid compounds that result from mixing the crude oil stream with supercritical water.

20 Claims, 3 Drawing Sheets

(56) References Cited

U.S. PATENT DOCUMENTS

| | | | |
|---|---|---|---|
| 7,591,983 B2 | 9/2009 | Takahashi et al. | |
| 7,909,985 B2 | 3/2011 | Hong et al. | |
| 7,947,165 B2 | 5/2011 | Berkowitz et al. | |
| 8,197,670 B2 | 6/2012 | Li et al. | |
| 2006/0231462 A1* | 10/2006 | Johnson | 208/125 |
| 2007/0056881 A1* | 3/2007 | Berkowitz et al. | 208/435 |
| 2008/0099374 A1 | 5/2008 | He et al. | |
| 2008/0099376 A1 | 5/2008 | He et al. | |
| 2008/0099377 A1 | 5/2008 | He et al. | |
| 2008/0099378 A1 | 5/2008 | He et al. | |
| 2009/0166261 A1 | 7/2009 | Li et al. | |
| 2009/0166262 A1 | 7/2009 | He et al. | |
| 2011/0180384 A1 | 7/2011 | Metz et al. | |
| 2011/0315600 A1 | 12/2011 | Choi et al. | |
| 2012/0061294 A1 | 3/2012 | Choi et al. | |
| 2012/0181217 A1 | 7/2012 | Choi et al. | |

OTHER PUBLICATIONS

Baldwin, R. M., et al. "Coal liquefaction catalysis using iron pyrite and hydrogen sulfide", Preprints of Papers—American Chemical Society, Division of Fuel Chemistry, 27, Issue 3-4, pp. 254-260 (1982).

Kishita, A., et al. "Upgrading of bitumen by hydrothermal visbreaking in supercritical water with alkali." Journal of the Japan Petroleum Institute 46.4 (2003): 215-221.

* cited by examiner

PROCESS TO UPGRADE AND DESULFURIZE CRUDE OIL BY SUPERCRITICAL WATER

FIELD OF THE INVENTION

This invention generally relates to a process for upgrading and desulfurizing crude oil using supercritical water while providing a method and apparatus to removed precipitated solid compounds that would otherwise foul the reactor and equipment.

BACKGROUND OF THE INVENTION

Most refining processes limit the concentration of salt compounds (most of which contain alkaline compounds) of the incoming crude oil feed. These salt compounds can be corrosive to the equipment used for processing and can also be poisonous to catalysts that are widely used in modern refining processes. Whole crudes vary in their salt content depending on their origin. While desalters can remove alkaline compounds from crude oil, desalters typically require a significant amount of energy and possibly additional injected chemicals. Additionally, the level of alkaline compounds remaining in the treated crude oil can still cause plugging problems in processes using supercritical water.

Supercritical water has characteristics that can be used to upgrade crude oil. For instance, the sharp decrease of the dielectric constant of water at and around its critical point makes alkaline compounds insoluble in supercritical water. The low solubility of alkaline compounds in supercritical water induces precipitation of alkaline compounds during processing of crude oil. During traditional processing of crude oil, the precipitate can then cause plugging and corrosion of reactors or downstream units such as heat exchangers. This can result in unexpected shut-down of the crude oil processing unit.

The present invention advantageously provides a process and apparatus for upgrading crude oil through the use of supercritical water while avoiding the clogging of the equipment by alkaline compounds that are present in various amounts in crude oil.

SUMMARY OF THE INVENTION

In one aspect, the invention provides a process for removal of contaminants from a crude oil stream. In the process, a crude oil stream is fed to a mixing apparatus. A supercritical water stream is also fed to the mixing apparatus. The crude oil stream and the supercritical water stream are mixed in the mixing apparatus to produce a mixed crude oil and supercritical water stream. Alkaline compounds precipitate upon mixing of crude oil with supercritical water.

The mixed crude oil and supercritical water stream, which includes the precipitated compounds, is then fed to a physical filter to remove solid compounds from the mixed crude oil and supercritical water stream. This filtering process produces a filtered mixed crude oil and supercritical water stream. The filtered mixed crude oil and supercritical water stream is then fed to a unit for further processing.

In another aspect, the invention provides a process for removal of contaminants from a crude oil stream. In this aspect, a water stream is fed at below supercritical conditions to a water filter to remove solid compounds to produce a filtered water stream. The filtered water stream is then heated to supercritical conditions using a heating apparatus to produce a filtered supercritical water stream. The filtered supercritical water stream is then fed to a mixing apparatus. A crude oil stream is also fed to the mixing apparatus. The crude oil stream and the filtered supercritical water stream are then mixed in the mixing apparatus to produce a mixed crude oil and supercritical water stream. The mixed crude oil and supercritical water stream is then fed to a physical filter to remove second solid compounds from the mixed crude oil and supercritical water stream. This also produces a filtered mixed crude oil and supercritical water stream. The filtered mixed crude oil and supercritical water stream is then fed to a unit for further processing. In some embodiments, the unit is a desulfurization unit, supercritical water reactor unit, hydrotreating unit, hydrocracking unit and other such units.

In another aspect, the invention provides a process for removal of contaminants from a crude oil stream. In this process, a water stream is fed to a water filter to remove solid alkaline compounds to produce a filtered water stream. The filtered water stream is then heated to supercritical conditions using a heating apparatus to produce a filtered supercritical water stream. The filtered supercritical water stream is maintained at a temperature of over 400° C. during the process. A crude oil stream is also fed to the mixing apparatus. The crude oil stream and the filtered supercritical water stream are then mixed in the mixing apparatus to produce a mixed crude oil and supercritical water stream. The mixed crude oil and supercritical water stream is then fed to a continuous stirred tank reactor to produce a turbulent flow mixed crude oil and supercritical water stream. The turbulent flow mixed crude oil and supercritical water stream is then fed to a physical filter to remove solid compounds from the mixed crude oil and supercritical water stream to produce a filtered mixed crude oil and supercritical water stream. The turbulent flow mixed crude oil and supercritical water stream is maintained at a temperature of over 400° C. during processing. The filtered mixed crude oil and supercritical water stream is then fed to a unit for further processing. In some embodiments, the unit is a desulfurization unit, supercritical water reactor unit, hydrotreating unit, hydrocracking unit and other such units.

The embodiments of the present invention generally allow for removal of alkaline components and other solid contaminants before the crude oil is further processed. This can enhance overall process operation stability. While usage of the process is envisioned for all types of crude oil, it will be particularly useful in the processing of highly alkaline petroleum feedstocks. Highly alkaline feedstocks can precipitate a relatively large number of alkaline compounds that can cause problems such as plugging and corrosion of the process line.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

As used herein, the term "crude oil" includes conventional whole range crude oil, non-conventional whole range crude oil (inferior crude oil, ultra heavy crude oil, and shale oil), bitumen, pre-refined bitumen, or its extract, product stream from a stream cracker, liquefied coal, liquid product recovered from oil sand, asphaltene, and hydrocarbons that originated from biomass.

As used herein, the term "alkaline compounds" include compounds having elements of Group 1 and Group 2 in the periodic table of elements. Exemplary alkaline compounds include chlorides, carbonates, sulfates, phosphate of sodium, potassium, and magnesium.

Figure 1:
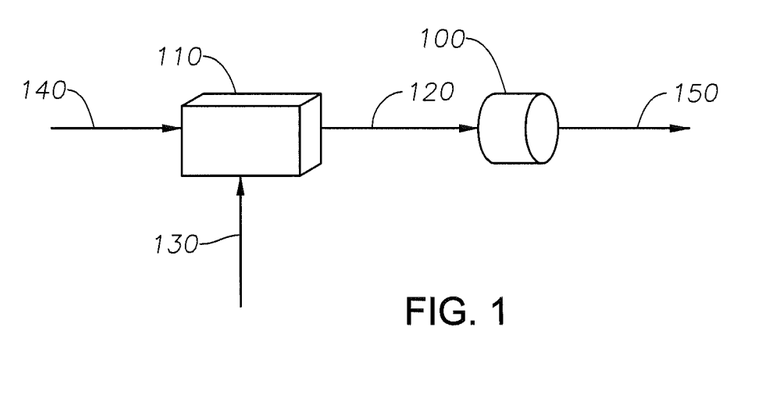
FIG. 1 shows a diagram of an embodiment of the present invention.

In one aspect, the invention provides a process for removal of contaminants from a crude oil stream. As shown in FIG. 1. In the process, a crude oil stream 140 is fed to a mixing apparatus 110. A supercritical water stream 130 is also fed to the mixing apparatus 110. The crude oil stream and the supercritical water stream are mixed in the mixing apparatus 110 to produce a mixed crude oil and supercritical water stream 120. The mixed crude oil and supercritical water stream is then fed to a physical filter 100 to remove solid compounds from the mixed crude oil and supercritical water stream. This filtering process produces a filtered mixed crude oil and supercritical water stream 150. The filtered mixed crude oil and supercritical water stream is then fed to a unit for further processing. In some embodiments, the unit is a desulfurization unit, supercritical water reactor unit, hydrotreating unit, hydrocracking unit and other such units.

In general, the unit for further processing can be any unit for further processing of crude oil. In some embodiments, the unit for further processing is a unit which benefits from a crude oil stream with reduced alkaline components. In further embodiments, the unit is a desulfurization unit, supercritical water reactor unit, hydrotreating unit, hydrocracking unit and other such units.

In further embodiments, the solid compounds are precipitated as a result of the crude oil stream and supercritical water stream mixing in the mixing apparatus. In some embodiments, the solid compounds include alkaline compounds.

In further embodiments, the process further includes the step of feeding the supercritical water stream to a water filter to produce a filtered supercritical water stream before feeding the supercritical water stream to the mixing apparatus. The water filter is operable to remove alkaline compounds contained in water.

In further embodiments, the supercritical water stream is maintained at or above supercritical levels during filtering. In further embodiments, the supercritical water stream is maintained at or above 400° C. during filtering. The temperature of the supercritical water stream can be maintained using various methods known in the art. Among them include insulation of the pipe, heat tracing, line heaters, or other heaters.

In further embodiments, the crude oil stream is at relatively low temperatures before being combined with the supercritical water stream. In some embodiments, the crude oil stream is at a temperature of less than 300° C. In other embodiments, the crude oil stream is at a temperature of less than 150° C. In some embodiments, the crude oil is pressurized at or above 22.1 MPa.

In further embodiments, the temperature of the mixed crude oil and supercritical water stream as it is fed to the physical filter is maintained at or above supercritical conditions for water. In some embodiments, the temperature of the mixed crude oil and supercritical water stream as it is fed to the physical filter is maintained at a temperature of over 400° C. In some embodiments, the temperature of the mixed crude oil and supercritical water stream as it is fed to the physical filter is maintained at a temperature of about 400° C. to about 450° C. The temperature of the mixed crude oil and supercritical water stream can be maintained using various methods known in the art. Among them include insulation of the pipe, heat tracing, line heaters, or other heaters.

In further embodiments, the temperature of the filtered mixed crude oil and supercritical water stream as it exits the filter is at or above supercritical conditions for water. In some embodiments, the temperature of the filtered mixed crude oil and supercritical water stream as it exits the filter is at or above at a temperature of 400° C. In some embodiments, even when the temperature of the mixed crude oil and supercritical water stream as it enters the filter is below the supercritical conditions for water, the temperature of the filtered mixed crude oil and supercritical water stream as it exits the filter is increased to above supercritical conditions for water. In some embodiments, even when the temperature of the mixed crude oil and supercritical water stream as it enters the filter is below the supercritical conditions for water, the temperature of the filtered mixed crude oil and supercritical water stream as it exits the filter is increased to at or above 400° C.

The mixing apparatus 110 of the present invention can be any type of mixing apparatus known in the art. In some embodiments, the mixing apparatus is selected from a static mixer, an in-line mixer, agitator, in-line equipment that can enhance mixing (e.g. ultrasonic probe), in-line parts that can enhance mixing (e.g. orifice), and an impeller embedded mixer.

Figure 3:
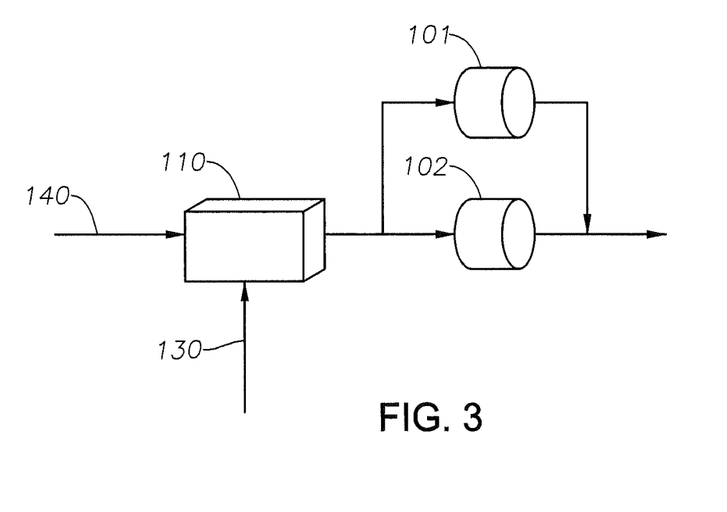
FIG. 3 shows a diagram of an embodiment of the present invention which includes at least two physical filters.

The physical filters 100 of the present invention can include any known physical filters in the art. In some embodiments, the filters include a cup-type filter, a membrane-type filter, or a depth-type filters. As shown in FIG. 3. In further embodiments, the physical filter can include two or more filters. As shown in FIG. 3. In some embodiments, the two or more filters 101 and 102 are arranged in parallel. In some embodiments, the physical filters are arranged in series. In further embodiments which include three or more physical filters, the physical filters can be arranged in series and parallel. When two or more filters are used, the filters can be the same or different.

In further embodiments, the physical filters are operable to remove solid particles which have a size of about 0.1 μm or larger. In further embodiments, the physical filters are operable to remove solid particles which have a size of about 1.0 μm or larger. In further embodiments, the physical filters are operable to remove solid particles which have a size of about 5.0 μm or larger. In further embodiments, the physical filters are operable to remove solid particles which have a size of about 10 μm or larger.

The arrangement of the physical filters can also be such so as to allow for cleaning of some physical filters while other physical filters are in use by the process. The filters can be cleaned by flowing cleaning water in reverse or forward flow direction. Temperature of the cleaning water is between about 5° C. to about 300° C. In some embodiments, the temperature of the cleaning water is between about 50° C. and about 90° C. Pressure of the cleaning water is maintained for the water in the liquid phase. Cleaning water can be selected from deionized water, feed water (to supercritical water process), and product water from an oil/water separator. During cleaning, the physical filters can be subjected to ultrasonic-type vibrator during cleaning for enhancing cleaning efficiency.

The temperature of the fluid in the filter is maintained at supercritical levels for water or above using various methods known in the art. Among them include insulation of the filter, heat tracing, and other heaters.

The length and diameter of the pipe 120 between the mixing apparatus 110 and the physical filter 100 can be selected to enhance mixing of the crude oil stream and the supercritical water stream by turbulence effect. The Reynolds number, which can be estimated by assuming crude oil has the same density and viscosity of water, should be over 4,000 at the end of the pipe, just before the filter. This ensures a high degree of mixing between crude oil and water.

In some embodiments, the process further includes the step of feeding the mixed crude oil and supercritical water stream to an apparatus for creating turbulent flow. The apparatus for creating turbulent flow of the mixed crude oil and supercritical water stream is used to produce a turbulent flow mixed crude oil and supercritical water stream before the mixed crude oil and supercritical water stream is fed to the physical filter. In some embodiments, the apparatus for creating turbulent flow is a continuous stirred tank reactor. In such embodiments, the diameter and rotation speed of the agitator in the continuous stirred reactor can be selected such that intimate mixing of the crude oil stream and supercritical water stream is achieved. Internal volume of the continuous stirred tank reactor can be determined by the residence time of the mixture fluid in the continuous stirred tank reactor. In some embodiments, the residence time is between about 1 and 120 seconds. In other embodiments, the residence time is between about 2 and 10 seconds.

Any known apparatus can be used for creating turbulent flow, in general, any apparatus (e.g., ultrasonic probe) which can cause continued and/or intimate mixing of the mixed crude oil and supercritical water stream can be used in order to aid mixing and cause precipitation of alkaline compounds.

The crude oil stream and the supercritical water stream can be fed through the process through independent high pressure pumps. The crude oil stream and the supercritical water stream are pumped to at least the critical pressure of water (22.1 MPa). In some embodiments, the crude oil stream and the supercritical water stream are pumped to a pressure of between about 22.2 MPa and about 41.5 MPa. In other embodiments, the crude oil stream and the supercritical water stream are pumped to a pressure of between about 22.9 MPa and about 31.1 MPa.

In some embodiments, the ratio of the volumetric flow rate of crude oil and water at ambient temperature and operating pressure is in the range of 10:1-1:10. In other embodiments, the ratio of the volumetric flow rate of crude oil and water at ambient temperature and operating pressure is in the range of 5:1-1:5, In further embodiments, the ratio of the volumetric flow rate of crude oil and water at ambient temperature and operating pressure is in the range of 2:1-1:2.

In further embodiments, the crude oil stream 170 and the water stream 160 are independently preheated using heaters 190 and 180 to predetermined levels. The supercritical water stream 130 can be heated to about 374° C. to 600° C. In some embodiment, the supercritical water stream 130 can be heated to about 400° C. to about 550° C. The crude oil stream 140 can be heated to about 10° C. to about 300° C. In some embodiments, the crude oil stream 140 can be heated to about 50° C. to about 200° C. Devices for heating the crude oil stream and water stream can be selected from any known devices in the art. Such devices include strip heaters, immersion heaters, and tubular furnaces. The heating device for the crude oil stream and the water stream can be the same or different.

In another aspect, the invention provides a process for removal of contaminants from a crude oil stream. In this aspect, a water stream is fed at below supercritical conditions to a water filter to remove solid compounds to produce a filtered water stream. The filtered water stream is then transformed to supercritical conditions using a heating apparatus to produce a filtered supercritical water stream. The filtered supercritical water stream is then fed to a mixing apparatus. A crude oil stream is also fed to the mixing apparatus. The crude oil stream and the filtered supercritical water stream are then mixed in the mixing apparatus to produce a mixed crude oil and supercritical water stream. The mixed crude oil and supercritical water stream is then fed to a physical filter to remove second solid compounds from the mixed crude oil and supercritical water stream 120 and to produce a filtered mixed crude oil and supercritical water stream 150. The filtered mixed crude oil and supercritical water stream 150 is then fed to a unit for further processing.

In further embodiments, the physical filters can include any known physical filters in the art. In some embodiments, the filters include cup-type filter, a membrane-type filter, or a depth-type filter. In further embodiments, the physical filter can include two or more filters. In some embodiments, the two or more filters are arranged in series. In some embodiments, the physical filters are arranged in parallel. In further embodiments, which include three or more physical filters, the physical filters can be arranged in series and parallel. When two or more filters are used, the filters can be the same or different.

In some embodiments, the process further includes the step of feeding the mixed crude oil and supercritical water stream to an apparatus for creating turbulent flow. The apparatus for creating turbulent flow of the mixed crude oil and supercritical water stream is used to produce a turbulent flow mixed crude oil and supercritical water stream before the mixed crude oil and supercritical water stream is fed to the physical filter. In some embodiments, the apparatus for creating turbulent flow is a continuous stirred tank reactor. Any known apparatus can be used for creating turbulent flow. In general, any apparatus which can cause continued and/or intimate mixing of the mixed crude oil and supercritical water stream can be used in order to aid mixing and cause precipitation of alkaline compounds can be used.

In further embodiments, the solid compounds are precipitated as a result of the crude oil stream and supercritical water stream mixing in the mixing apparatus. In some embodiments, the solid compounds include alkaline compounds.

In further embodiments, the process further includes the step of feeding the supercritical water stream to a water filter to produce a filtered supercritical water stream before feeding the supercritical water stream to the mixing apparatus. In further embodiments, the supercritical water stream is maintained at or above supercritical levels during filtering. In further embodiments, the supercritical water stream is maintained at or above 400° C. during filtering. The temperature of the supercritical water stream can be maintained using various methods known in the art. Among them include insulation of the pipe, heat tracing, line heaters, or other heaters.

In further embodiments, the temperature of the mixed crude oil and supercritical water stream as it is fed to the physical filter is maintained at or above supercritical conditions for water. In some embodiments, the temperature of the mixed crude oil and supercritical water stream as it is fed to the physical filter is maintained at a temperature of over 400° C. The temperature of the mixed crude oil and supercritical water stream can be maintained using various methods known in the art. Among them include insulation of the pipe, heat tracing, line heaters, or other heaters.

In another aspect, the invention provides a process for removal of contaminants from a crude oil stream. In this process, a water stream is fed to a water filter to remove solid alkaline compounds to produce a filtered water stream. The filtered water stream is then heated to supercritical conditions using a heating apparatus to produce a filtered supercritical water stream. The filtered supercritical water stream is maintained at a temperature of over 400° C. during the process. The filtered supercritical water stream is then fed to a mixing apparatus. The filtered supercritical water stream is maintained at a temperature of over 400° C. during the process. A crude oil stream is also fed to the mixing apparatus. The crude oil stream and the filtered supercritical water stream are then mixed in the mixing apparatus to produce a mixed crude oil and supercritical water stream. The mixed crude oil and supercritical water stream is then fed to a continuous stirred tank reactor to produce a turbulent flow mixed crude oil and supercritical water stream. The turbulent flow mixed crude oil and supercritical water stream are then fed to a physical filter to remove second solid compounds from the mixed crude oil and supercritical water stream to produce a filtered mixed crude oil and supercritical water stream. The turbulent flow mixed crude oil and supercritical water stream is maintained at a temperature of over 400° C. during processing. The filtered mixed crude oil and supercritical water stream is then fed to a unit for further processing.

Figure 2:
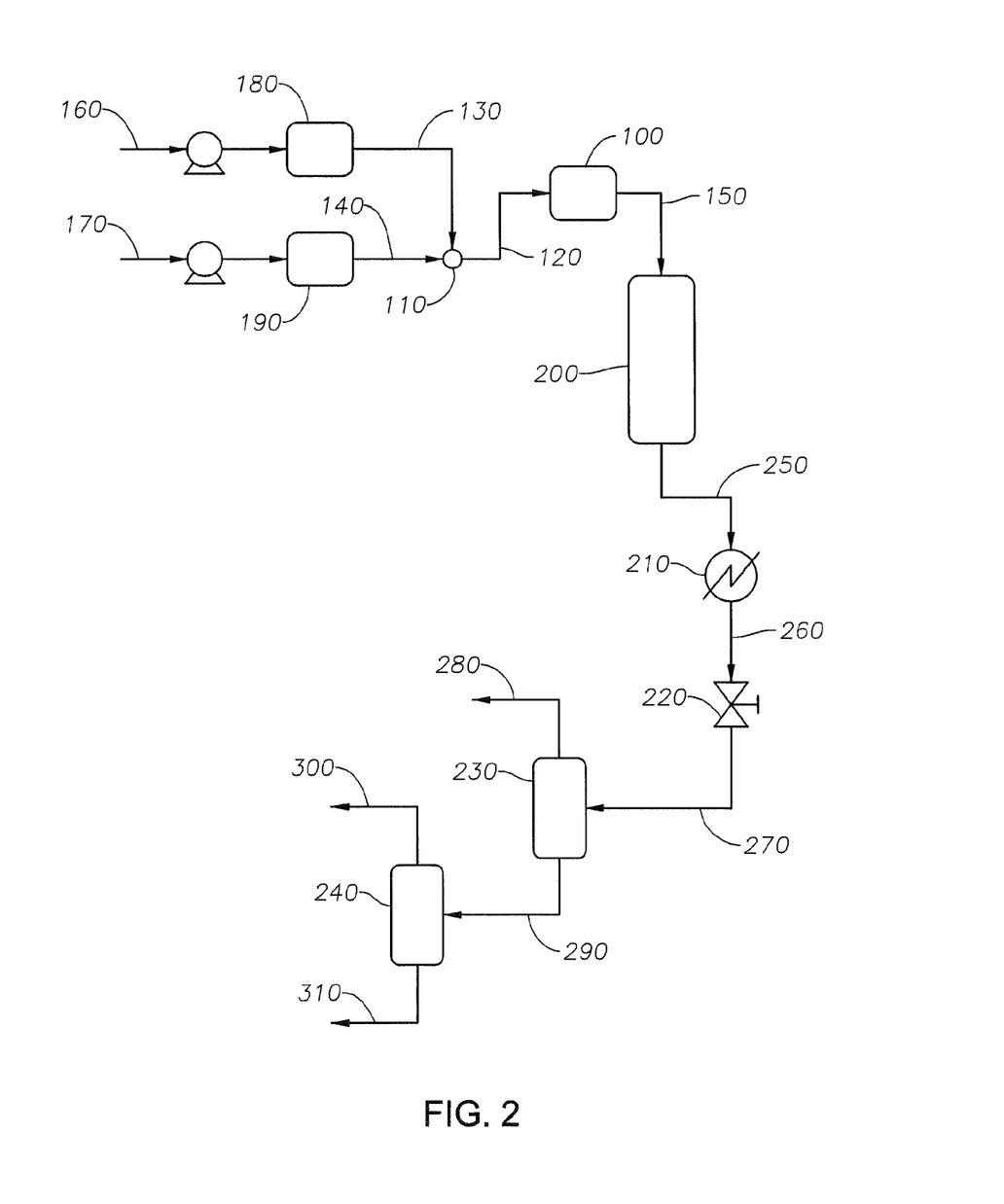
FIG. 2 shows a diagram of an embodiment of the present invention.

In further embodiments, as shown in FIG. 2, the filtered mixed crude oil and supercritical water stream 150 is fed to a supercritical water reactor 200. The supercritical water reactor 200 can be a tubular type reactor, vessel type reactor, or others known in the art. In some embodiments, the supercritical water reactor can have an agitator. The supercritical reactor can be horizontal, vertical, or both. The supercritical water reactor can be two or more reactors arranged in series or parallel. The flow direction can be upflow or downflow, or a combination thereof.

The temperature of the supercritical water reactor 200 is maintained at a temperature of above 374° C. In some embodiments, the temperature of the supercritical water reactor is maintained at a temperature of between about 380° C. and 600° C. In further embodiments, the supercritical water reactor is maintained at a temperature of between about 390° C. and 450° C. The temperature of the supercritical water reactor can be maintained using methods known in the art. Among these include strip heaters, immersion heaters, and tubular furnaces. In some embodiments, the residence time fluid in the supercritical water reactor is between about 1 and 120 minutes. In other embodiments, the residence time is between about 10 seconds and 60 minutes. In other embodiments, the residence time is between about 30 seconds and 20 minutes.

In further embodiments, effluent 250 from the supercritical water reactor 200 is transferred to a cooling device 210 to produce a cooled stream 260. The cooling device 210 can be selected from any cooling devices known in the art. Among cooling devices known in the art are chillers and heat exchangers. The resulting temperature of the cooled stream is about 10° C. and 200° C. In some embodiments, the resulting temperature of the cooled stream is about 30° C. and 150° C.

In further embodiments, the cooled stream 260 is depressurized using a depressurized device 220 to a discharged stream 270. The depressurizing device 220 can be selected from any such device known in the art. Among those known in the art are pressure regulatory valves and capillary tubes. The discharged stream 270 is then separated into a gas phase stream 280 and liquid phase stream 290 using a gas-liquid separator 230. The liquid phase stream 290 is then separated into a water stream 310 and a petroleum product 300 using an oil-water separator 240.

Figure 4:
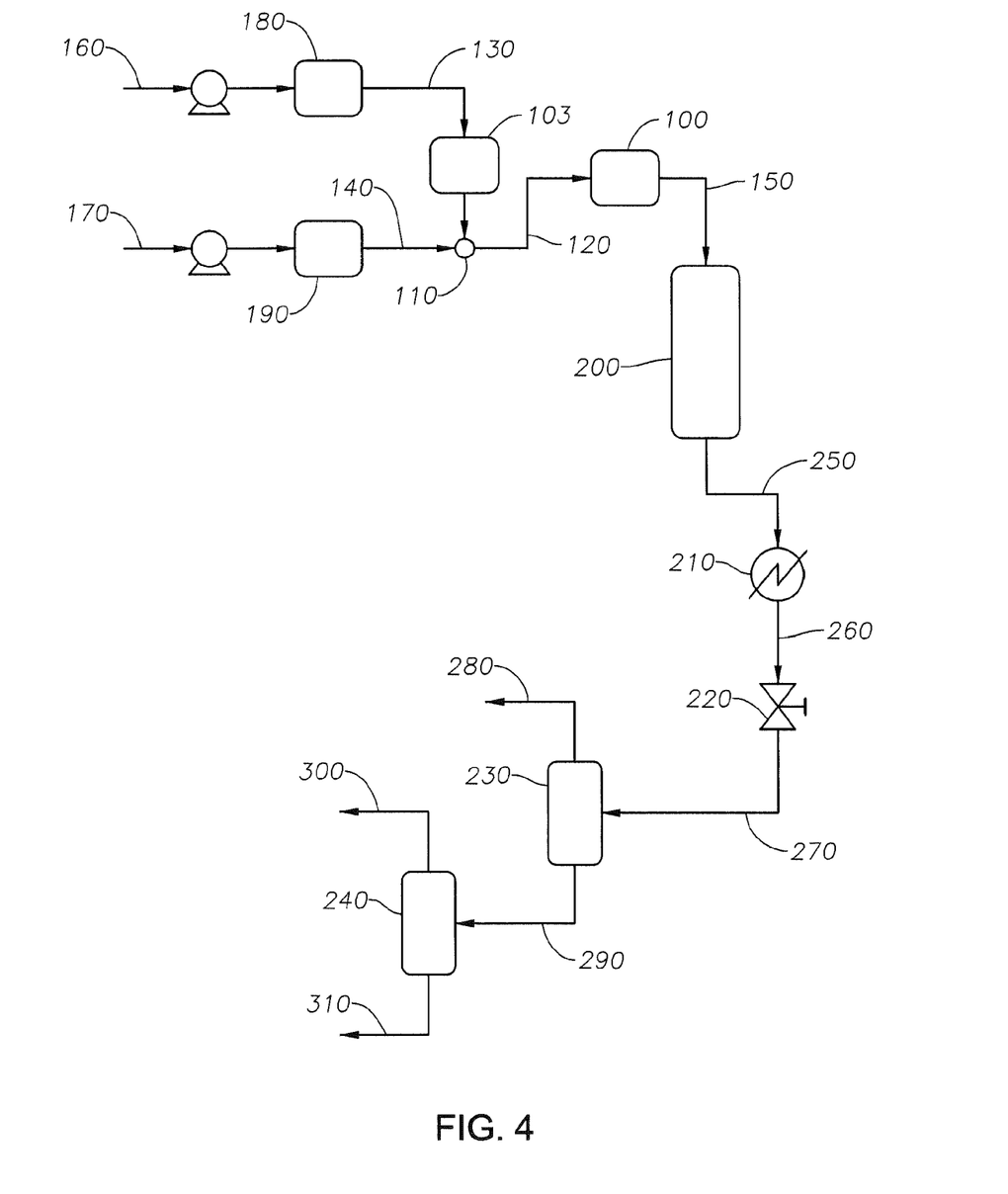
FIG. 4 shows a diagram of an embodiment of the present invention.

As shown in FIG. 4, some embodiments further include a water filter 103 for filtering supercritical water.

EXAMPLE

A whole range Arabian Heavy crude oil with API gravity at 60° F. of 26.3° and total sulfur content of 3.00 wt % was provided. The crude oil had a salt content of 5 PTB of NaCl. Water used for testing was Grade I, defined by ASTM D1193. Resistivity of water was 18 M-Ohm-cm at 25° C. The crude oil was pre-heated to 50° C. by winding transferring line of 0.083 inch I.D. with heating tape (BriskHeat heating tape). The water was preheated to 550° C. by a block heater (LINDBERG 3 zone tubular furnace). The water and crude oil were pumped by separate high pressure metering pumps to have a volumetric flow ratio to be 5 ml/5 ml at an ambient temperature and a pressure of 3,600 psig. The pressurized and preheated water was combined with pressurized and preheated crude oil using a simple tee fitting (Autoclave Engineers, CT4440). The tee fitting was connected to a high pressure filter (AutoClave Engineers, CF4-5) by a transferring line which was wound with heating tape (Briskheat heating tape). The length of the transferring line between the tee fitting and the filter was 12.0 inches and the inner diameter (I.D.) was 0.083 inches. The temperature of the fluid inside the transferring line was measured to be 410° C. by a thermocouple inserted at the point approximately 0.5 inches before the filter inlet. The Reynolds number of the fluid at the inlet of the filter was calculated to be 5,450 by assuming crude oil had the density and viscosity of water at the same conditions. The fluid from the filter was injected to the reactor. The reactor was 27.5 inches long and 9/16 inch outer diameter (O.D.) (3/16 inch I.D.), giving the reactor an internal volume of approximately 12.4 ml. The temperature of the fluid in the reactor was controlled at approximately 430° C. by a block heater (AJEON 3-zone tubular furnace). The effluent from the reactor was cooled down to 50° C. by using a double pipe-type heat exchanger and then depressurized to ambient condition by back pressure regulator (TESCOM 26-1762-24-090). The pressure of the system was maintained at 3,600 psig. The product was subjected to a demulsification procedure where a demulsifier was added to separate the oil and water phases. The separated oil product showed API gravity at 60° F. of 31.7° and a sulfur content of 2.34 wt %. After operation for 48 hours, the pressure difference through the process line (before the filter and after the heat exchanger) was increased to 200-300 psig. The filter was removed from the process line and the solid deposit in the filter was removed to analyze with Scanning Electron Microscope-Energy Dispersive Spectroscopy (SEM-EDS). The contents of the solid deposit included calcium phosphate, as well as solid carbon and iron oxide. Calcium and phosphorous were contained in the crude oil as trace amount. The deposited calcium phosphate induced coke deposition and corrosion of filter, which produced iron oxide particles. There was no solid deposit found in the line after filter and no pressure difference between inlet and outlet of reactor. This observation shows the effectiveness of the method disclosed in this invention.

Without being held to theory, it is believed that the sharply decreasing dielectric constant is the driving force for precipitation of the alkaline compounds. This decrease is seen at and around the supercritical point. Supercritical is used to describe the conditions around the supercritical point of water where this drop in dielectric constant is observed. It also extends above the supercritical point. Water exhibits supercritical properties around the supercritical temperature of about 374 degrees C. and around the supercritical pressure of 22.1 MPa.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are claimed in terms of "comprising," "containing," or "including" various components or steps, the compositions and methods can also "consist essentially of" or "consist of" the various components and steps. All numbers and ranges disclosed above may vary by some amount. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

The invention claimed is:

1. A process for removal of contaminants from a crude oil stream, the process comprising the steps of:
   feeding a crude oil stream to a mixing apparatus, wherein the mixing apparatus is selected from a static mixer, an in-line mixer, agitator, in-line parts that can enhance mixing, and an impeller embedded device;
   feeding a supercritical water stream to the mixing apparatus;
   mixing the crude oil stream and the supercritical water stream in the mixing apparatus to produce a mixed crude oil and supercritical water stream, wherein mixing the crude oil stream and the supercritical water stream in the mixing apparatus causes solid compounds to precipitate;
   feeding the mixed crude oil and supercritical water stream to a physical filter to remove the solid compounds from the mixed crude oil and supercritical water stream and to produce a filtered mixed crude oil and supercritical water stream;
   feeding the filtered mixed crude oil and supercritical water stream to a unit for further processing, wherein the filtered mixed crude oil and supercritical water stream are subjected to upgrading reactions that occur in the unit for further processing.

2. The process of claim 1 wherein the unit is a desulfurization unit.

3. The process of claim 1 wherein the solid compounds are alkaline compounds.

4. The process of claim 1 further comprising the step of:
   feeding the supercritical water stream to a water filter to produce a filtered supercritical water stream before feeding the supercritical water stream to the mixing apparatus.

5. The process of claim 1 wherein the physical filter comprises two or more filters arranged in series.

6. The process of claim 1 wherein the physical filter comprises two or more physical filters arranged in parallel.

7. The process of claim 1 wherein the temperature of the mixed crude oil and supercritical water stream as it is fed to the physical filter is maintained at a temperature of over 400° C.

8. The process of claim 1 wherein the physical filter is a cup-type filter, a membrane-type filter, or a depth-type filter.

9. The process of claim 1 further comprising the step of:
   feeding the mixed crude oil and supercritical water stream to an apparatus for creating turbulent flow of the mixed crude oil and supercritical water stream to produce a turbulent flow mixed crude oil and supercritical water stream before feeding the mixed crude oil and supercritical water stream to the filter.

10. The process of claim 9 wherein the apparatus for creating turbulent flow is a continuous stirred tank reactor.

11. The process of claim 1 wherein the unit is selected from the group consisting of a desulfurization unit, a supercritical water reactor unit, a hydrotreating unit, and a hydrocracking unit.

12. A process for removal of contaminants from a crude oil stream, the process comprising the steps of:
   feeding a water stream below supercritical conditions to a water filter to remove solid compounds to produce a filtered water stream;
   heating the filtered water stream to supercritical conditions using a heating apparatus to produce a filtered supercritical water stream;
   feeding the filtered supercritical water stream to a mixing apparatus, wherein the mixing apparatus is selected from a static mixer, an in-line mixer, agitator, in-line parts that can enhance mixing, and an impeller embedded device;
   feeding a crude oil stream to the mixing apparatus;
   mixing the crude oil stream and the filtered supercritical water stream in the mixing apparatus to produce a mixed crude oil and supercritical water stream;
   feeding the mixed crude oil and supercritical water stream to a physical filter to remove second solid compounds from the mixed crude oil and supercritical water stream and to produce a filtered mixed crude oil and supercritical water stream;
   feeding the filtered mixed crude oil and supercritical water stream to a unit for further processing, wherein the filtered mixed crude oil and supercritical water stream are subjected to upgrading reactions that occur in the unit for further processing.

13. The process of claim 12 wherein the physical filter comprises two or more filters arranged in series.

14. The process of claim 12 wherein the physical filter comprises two or more filters arranged in parallel.

15. The process of claim 12 wherein the temperature of the mixed crude oil and supercritical water stream as it is fed to the physical filter is maintained at a temperature of over 400° C.

16. The process of claim 12 wherein the physical filter is a cup-type filter, a membrane-type filter, or a depth-type filter.

17. The process of claim 12 wherein the solid compounds are alkaline compounds in the water stream.

18. The process of claim 12 wherein the second solid compounds are alkaline compounds that precipitate as a result of the crude oil stream mixing with the supercritical water stream in the mixing apparatus.

19. The process of claim 12 further comprising the step of:
feeding the mixed crude oil and supercritical water stream to an apparatus for creating turbulent flow of the mixed crude oil and supercritical water stream to produce a turbulent flow mixed crude oil and supercritical water stream before feeding the mixed crude oil and supercritical water stream to the filter.

20. The process of claim 19 wherein the apparatus for creating turbulent flow is a continuous stirred tank reactor.

* * * * *